June 23, 1959
K. A. RAYPHOLTZ
2,891,751
COMBINATION HANGER AND SPACER
Filed Aug. 13, 1958
2 Sheets-Sheet 1
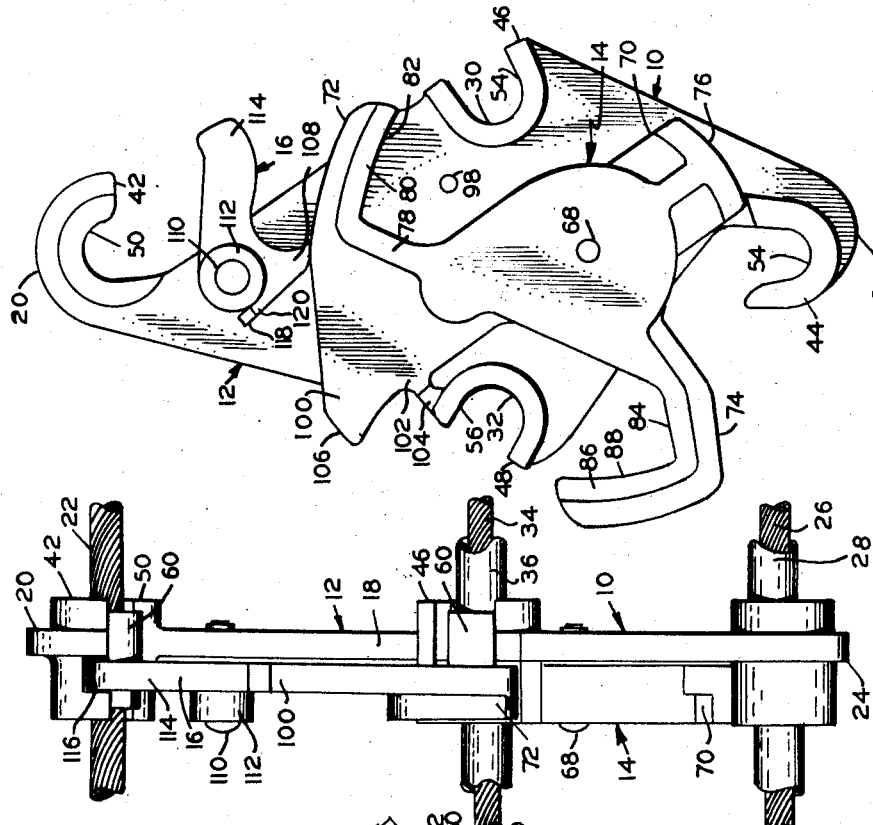
INVENTOR.
KENNETH A. RAYPHOLTZ
BY Robert D. Sommer
AGENT June 23, 1959  K. A. RAYPHOLTZ  2,891,751
COMBINATION HANGER AND SPACER
Filed Aug. 13, 1958  2 Sheets-Sheet 2

INVENTOR.
KENNETH A. RAYPHOLTZ
BY Robert D. Sommer

AGENT

United States Patent Office 2,891,751
Patented June 23, 1959

2,891,751

COMBINATION HANGER AND SPACER

Kenneth A. Raypholtz, Marion, Ind., assignor to Essex Wire Corporation, Fort Wayne, Ind.

Application August 13, 1958, Serial No. 754,866

10 Claims. (Cl. 248—61)

This invention relates to improvements in suspension means for electrical conductors and more particularly to an improved combination hanger and spacer for suspending a plurality of electrical conductors from a messenger wire.

Overhead conductors or cables are commonly suspended from a messenger wire usually made of steel. The messenger wire is supported on poles or towers with conductor hangers arranged at spaced intervals along the messenger wire to suspend one or more conductors. Since many power circuits require three phase alternating current electric power, it is often convenient to suspend conductors in groups of three employing a hanger which supports all three conductors and simultaneously maintains the conductors in spaced relation.

If the advantages of suspending conductors in this manner are to be fully availed, it is essential that the hanger be easily attached to the messenger wire and the conductors. To provide maximum utility, the conductor hanger must be capable of assembly to the messenger wire and the conductors without use of any tool. Along this same line, all parts of the conductor hanger should be retained together such that no part is removable. The construction of the conductor hanger should be such that the hanger has both high mechanical strength and high electrical strength and is durable in use. In addition to these requirements, the hanger must be easily and economically manufactured.

It is therefore one object of the present invention to provide an improved conductor hanger which greatly simplifies the attachment of conductors and a messenger wire thereto.

Another object of the invention is to provide a readily detachable conductor hanger which firmly and positively retains a messenger wire and a plurality of conductors in place upon being attached thereto.

Still another object of the invention is to provide a rugged conductor hanger which will withstand rough handling and which will be durable.

A further object of the invention is to provide a conductor hanger which can be easily and economically manufactured on a quantity basis.

Other objects and advantages of the invention will be apparent from consideration of the following description taken in connection with the accompanying drawings in which:

Figure 1 is an elevational view of a preferred embodiment of the invention shown in place upon a messenger wire and three insulated conductors;

Figure 2 is a side view of Figure 1;

Figure 3 is a view similar to Figure 1 showing the conductor hanger in the open position;

Figure 4:
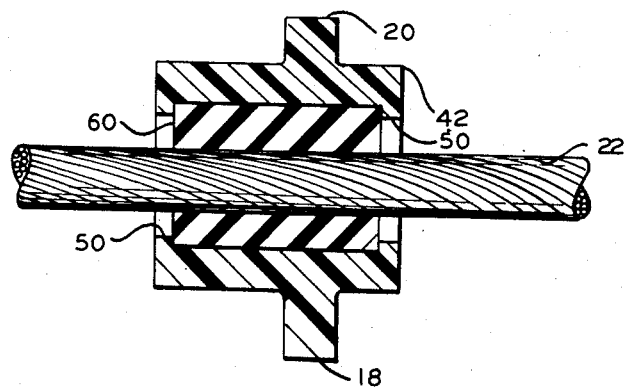
Figure 5:
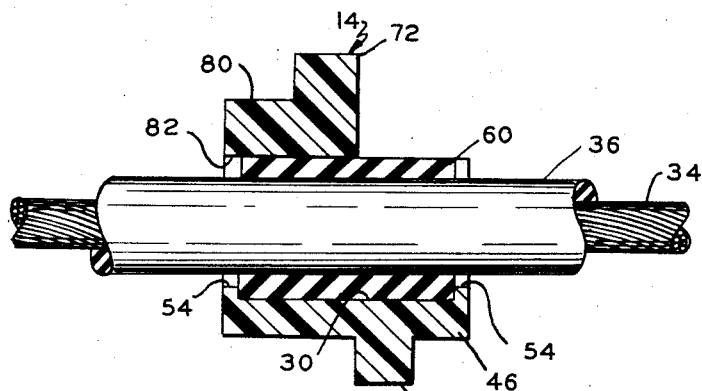
Figure 6:
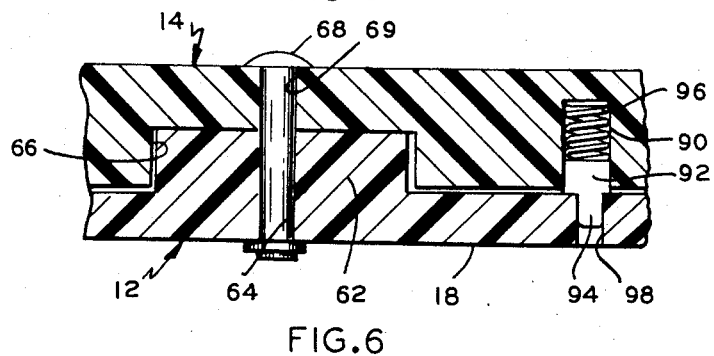

Figures 4, 5, and 6 are enlarged sectional views taken, respectively, substantially along the lines 4—4, 5—5, and 6—6 of Figure 1.

Referring to the drawings, the conductor hanger 10 includes a body member 12, a clamping member 14 pivotally secured to the body member 12, and a cam lever 16 pivotally secured to the body member 12 and pivotally movable upon movement of the clamping member 14. Parts 12, 14 and 16 are preferably molded from an acrylic resin molding compound or other plastic material having suitable electrical and mechanical properties.

The body member 12 comprises a generally flat web 18 provided at its upper end with a downwardly bent arm 20 for hooking over a messenger wire 22 and at its lower end with an upwardly bent arm 24 for receiving and supporting a conductor 26 which may have an insulating sheath 28. Opposite edges of the web 18 intermediate arms 20 and 24 have obliquely sideways facing notches 30 and 32 for receiving and supporting, respectively, conductor 34 which may have an insulating sheath 36 and conductor 38 which may have an insulating sheath 40. The web 18 is extended upon both faces thereof at arms 20 and 24 and at notches 30 and 32 to form, respectively, channels 42, 44, 46, and 48. Shoulder portions 50, 52, 54, and 56, respectively, are formed at opposite ends of channels 42, 44, 46, and 48 to prevent lateral shifting of split bushings or sleeves 60 fitted over messenger wire 22 and the sheathes of conductors 26, 34, and 38. Bushings 60 are preferably formed from an elastic, deformable synthetic rubber such as polymerized chloroprene.

Channels 44, 46, and 48 are equilaterally spaced about a cylindrical hub section 62 (Figure 6) integrally projecting from web 18 and having a centrally located aperture 64. The clamping member 14 is provided with a cylindrical cavity 66 to receive hub section 62 with some clearance so that clamping member 14 may rotate with respect to body member 12. The clamping member 14 may be secured to the body member 12 by a rivet 68 passing through aperture 64 of hub section 62 and an aperture 69 in clamping member 14 concentrically disposed with respect to cavity 66.

The clamping member 14 includes three spaced projecting arms 70, 72, and 74 for closing, respectively, the open faces of channels 44, 46, and 48. Arm 70 has a convex end surface 76 to permit its rotation across the open face of channel 44 with only a slight separation therebetween. Arm 72 has an L-shaped configuration comprising a connecting section 78 and a clamping section 80 having a concave inwardly facing surface 82 which may be rotated across the open face of channel 46 with only a slight separation therebetween. Arm 74 is generally similar in configuration to arm 72 and includes a connecting section 84 and a clamping section 86 having a concave inwardly facing surface 88. It can be seen that when the clamping member 14 is rotated to the position shown in Figure 2, the arms 70, 72, and 74 close the channels 44, 46, and 48 of the body member 12 and firmly engage the bushings 60 such that the bushings 60 and the respective conductors 26, 34, and 38 are securely held and supported. To retain the clamping member 14 in the closed position, it is provided with a recess 90 (Figure 6) in which is positioned a latch 92 having a reduced diameter end 94 adapted to be urged by spring 96 into hole 98 in web 18 of body member 12. Latch 92 may be disengaged from hole 98 to rotate the clamping member 14 to its open position by simply inserting a rod, a nail, or like instrument into hole 98.

The clamping member 14 also includes an integral projection 100 of generally triangular shape disposed adjacent arm 72. One edge of projection 100 is provided with an extending lug 102 for engagement with stop 104 integrally formed upon web 18 adjacent channel 48. Abutment of lug 102 against stop 104 limits the extent of rotation of the clamping member in the counterclockwise direction as seen in Figure 3. Rotation of the clamping member 14 in the clock-wise direction is limited by abutment of the arm connecting sections 78 and 84 against the respective channels 46 and 48.

Another edge of projection 100 of the clamping member 14 is formed to provide a cam surface 106 which operatively engages the cam arm 108 of the cam lever 16. Cam lever 16 is pivotally secured to the web 18 of the body member 12 by a headed stud 110 passing through the reinforcing boss 112. Extending at an angle to the cam arm 108 of the cam lever 16 is a clamping arm 114 received in a groove 116 of channel 42 of the body member 12 for closing channel 42. It will be noted the clamping arm 114 of cam lever 16 is moved to the closed position upon engagement of the cam arm 108 by the cam surface 106 of the clamping member 14 when it is rotated to the closed position. Web 18 is provided with an integral projecting stop 118 against which surface 120 of the cam lever arm 108 abuts to prevent engagement of the cam arm 108 by cam surface 106 of the clamping member 14 when the clamping member 14 is in its open position.

In using the hanger 10, bushings 60 are fitted over the messenger wire 22 and the sheaths of conductors 26, 34, and 38. The hanger 10 is then hooked over the messenger wire 22 with its bushing 60 positioned in channel 42 intermediate the shoulders 50. In a similar manner, conductors 26, 34, and 38 with their bushings 60 are positioned in their respective channels 44, 46, and 48. Thereupon, the clamping member 14 is manually rotated to its closed position where it is automatically locked in position. The closing action of the clamping member 14 also automatically causes the cam lever 16 to move to its closed position where it is retained by the engagement of its cam arm 108 with cam surface 106 of the clamping member 14. Thus only the simple manual movement of the clamping member 14 is required to automatically lock the three conductors and the messenger wire in spaced relation. No loose parts are employed which might be dropped. To release the messenger wire and the conductors from hanger 10, it is necessary to only insert a rod or similar device in hole 98 to displace latch 92 and then manually rotate the clamping member 14 to the open position.

From the foregoing, it will be apparent that the hanger embodying the invention is well-adapted for the attainment of the objects set forth above, the hanger being readily and positively attached to the conductors and a messenger wire and yet is readily detachable. It will also be apparent from the construction of the hanger that it is durable and reliable in use and can be manufactured economically by means of conventional apparatus and techniques.

While the invention has been illustrated and described in its preferred embodiment and has included certain details, it should be understood that the invention is not to be limited to the precise details herein illustrated and described since the same may be carried out in other ways falling within the scope of the invention as claimed.

What is claimed is:

1. A combination hanger and spacer for suspending a plurality of conductors from a messenger wire comprising a body member having a hook portion for engagement over the messenger wire and spaced sockets for supporting the conductors; a clamping member pivotally fastened to the body member and having clamping sections for closing the open faces of the sockets when the clamping member is moved to a closed position; a clamping lever pivotally fastened to the body member adjacent the hook portion so that it can be closed thereupon; operating means upon the clamping member engaging the cam lever upon movement of the clamping member to its closed position to cause the clamping lever to be closed over the hook portion of the body member.

2. A combination hanger and spacer for suspending a plurality of conductors from a messenger wire comprising a body member having a downwardly bent arm for hooking over the messenger wire and spaced channel portions for supporting the conductors; a clamping member rotatably secured to the body member and having clamping arms extending therefrom for closing the open faces of the channel portions when the clamping member is rotated to a closed position; a cam lever pivotally secured to the body member adjacent the bent arm so that it can be closed thereupon; a cam surface disposed upon the clamping member and engaging the cam lever upon rotary movement of the clamping member to its closed position to cause the cam lever to be closed upon the bent arm.

3. The combination hanger and spacer as defined in claim 2 and including stop means limiting the extent of rotation of the clamping member from its closed position to an open position, and latch means for releasably locking the clamping member in its closed position.

4. The combination hanger and spacer as defined in claim 2 wherein the channel portions are provided with means to limit lateral shifting of bushings fitted over the conductors and received in the channel portions, and wherein the surfaces of the clamping arms opposite the channel portions are closely spaced thereto to bear against the bushings for compressing the bushings in the channel portions.

5. A combination hanger and spacer for suspending three conductors from a messenger wire comprising a body member provided at its upper end with a channelled downwardly bent arm for engagement over a rubber-like bushing carried by the messenger wire, at each of its opposite sides below the level of the bent arm with a generally sideways facing channel for receiving rubber-like bushings carried by two of the conductors, and at its lower end with an upwardly facing channel for receiving a rubber-like bushing carried by the third of the conductors; a clamping member pivotably secured to the body member intermediate the channels for pivotal movement between open and closed positions; three clamping arms extending from the clamping member and having end surfaces arranged to pass over the open faces of the channels with only a slight separation therebetween upon movement of the clamping member to its closed position for compressing the bushings in the channels; a cam lever pivotally secured to the body member adjacent the bent arm so that it can be closed thereupon; a cam surface arranged upon the clamping member and engaging the cam lever upon movement of the clamping member to its closed position to cause the cam lever to be closed upon the bent arm and bear against the bushing carried by the messenger wire; and latch means for releasably locking the clamping member in its closed position.

6. The combination hanger and spacer as defined in claim 5 wherein the channels are arranged to support the conductors in equilaterally spaced relation.

7. The combination hanger and spacer as defined in claim 5 wherein the clamping member is guided for pivotal movement relative to the body member by means of a cylindrical hub section integrally formed upon the body member and received in a cavity formed in the clamping member.

8. The combination hanger and spacer as defined in claim 5 wherein the end surface of each clamping arm closing a channel facing away from the pivotal axis of the clamping member has a concave outline and the end surface of each clamping arm closing a channel facing toward the pivotal axis of the clamping member has a convex outline.

9. A combination hanger and spacer for suspending a plurality of conductors from a messenger wire comprising a body member having a hook portion for engagement over the messenger wire and spaced sockets for supporting the conductors; first and second clamping members fastened to the body member and having clamping sections for closing the open faces of the hook portion and sockets of the body member; the first and second clamping members having cooperating cam surfaces such that closing movement of the first clamping member urges the second clamping member into its closed position; and means for releasably retaining the first and second clamping members in their closed positions.

10. A combination hanger and spacer for suspending a plurality of conductors from a messenger wire comprising a body member having a hook portion for engagement over the messenger wire and spaced sockets for supporting the conductors; first and second clamping members fastened to the body member for movement relative thereto and having clamping sections for closing the open faces of the hook portion and sockets of the body member; means operatively associated with the first and second clamping members for urging the second clamping member into its closed position upon closing movement of the first clamping member; and means operatively connected with the body member and the first clamping member for releasably holding the first clamping member in its closed position.

References Cited in the file of this patent

UNITED STATES PATENTS 2,820,083    Hendrix _____ Jan. 14, 1958